United States Patent [19]

Hickman

[11] 4,409,535

[45] Oct. 11, 1983

[54] GATED ASYNCHRONOUS CARRIER MODULATION

[75] Inventor: Mark R. Hickman, Westboro, Mass.

[73] Assignee: Vee Arc Corporation, Westboro, Mass.

[21] Appl. No.: 359,615

[22] Filed: Mar. 18, 1982

[51] Int. Cl.³ .............................................. H02P 5/34
[52] U.S. Cl. ..................................... 318/811; 363/41; 307/269
[58] Field of Search ................................ 318/798–802, 318/807, 810–811; 363/39–41, 95–96; 307/265

[56] References Cited

U.S. PATENT DOCUMENTS

| | | | |
|---|---|---|---|
| 3,569,805 | 3/1971 | Hammond | 318/811 |
| 3,624,486 | 11/1971 | Oates | 363/41 X |
| 3,886,430 | 5/1975 | Meier | 363/41 |
| 4,179,727 | 12/1979 | Muto et al. | 363/41 |
| 4,333,042 | 1/1982 | Kawada et al. | 318/811 |

Primary Examiner—J. V. Truhe
Assistant Examiner—Patrick Keane
Attorney, Agent, or Firm—David M. Driscoll

[57] ABSTRACT

A motor pulse width modulation control technique employing gated asynchronous carrier modulation including establishing a repetitive modulation signal along with the generation of a carrier frequency signal at a frequency greater than the frequency of the modulation signal. The carrier frequency signal is gated at a gating rate less than the frequency of the carrier frequency signal so as to provide the gated carrier frequency signal. Means are provided for modulating the gated carrier frequency signal by the aforementioned repetitive modulation signal so as to provide cyclic pulse width modulation drive signal for motor control.

10 Claims, 26 Drawing Figures

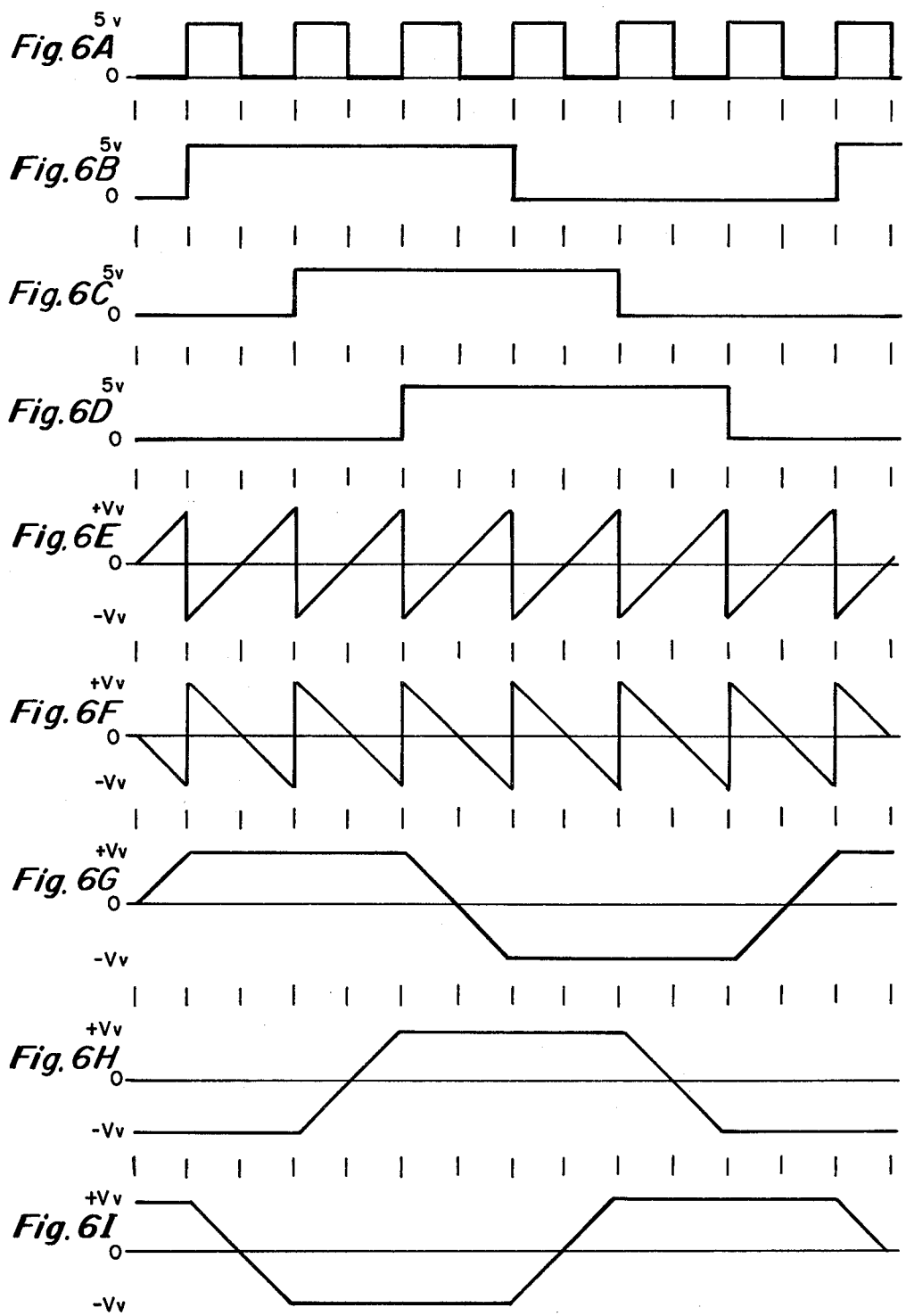

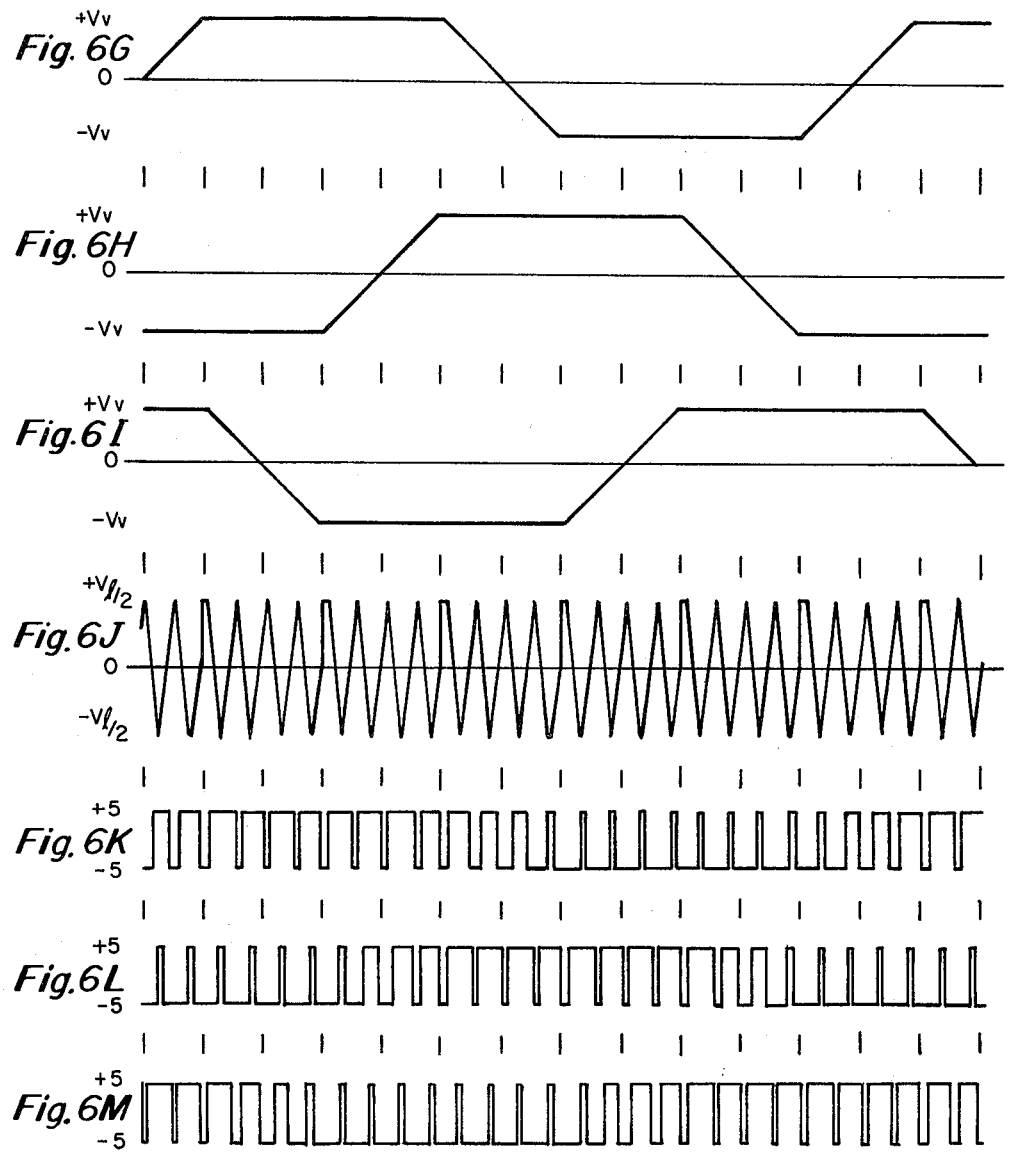

GATED ASYNCHRONOUS CARRIER MODULATION

BACKGROUND OF THE INVENTION

The present invention relates very generally to adjustable frequency motor control, and pertains, more particularly, to a pulse width modulation AC motor control that provides substantial improvement in operating parameters characterized in particular by cogless rotation even at low operating speeds.

In AC motor control, the AC motor control circuitry typically comprises an input rectifier and filter, a three-phase power inverter, and associated control circuitry for controlling the output voltage amplitude and frequency of the power inverter. In a pulse width modulated inverter, each output leg of the inverter is switched between high and low input potentials at a frequency which is much faster than the desired output frequency.

The output voltage of a leg of the inverter, referred to herein as the phase voltage, is usually referenced to the negative input potential. If a phase voltage is averaged over one of the high frequency switching cycles, the average value is proportional to the duty cycle, or the amount of time the output leg is switched to the positive input relative to the total cycle time. Thus, if the duty cycle is varied, in a periodic nature about some nominal duty cycle, the phase voltage has a proportional AC component oscillating about a nominal DC voltage. Increasing the modulation or the magnitude or the change in the duty cycle, increases the amplitude of the AC component of the phase voltage.

In the case of AC motor control, the motor is generally connected to three inverter output phases whose AC components are 120° out of phase with each other. In such a connection, the phase-to-phase voltage applied to the load is the difference of the individual phase voltages. Thus, if the DC components of each phase are equal, the phase-to-phase voltage has only an AC component which is the vector difference of the AC components of the phases involved.

In the case wherein the DC components of two phase voltages are not equal, then a DC component is present in a resultant phase-to-phase voltage. With AC motors or other inductive loads, a DC voltage of even a few volts gives rise to significant DC current flows due to extremely low impedance of the devices at or near zero frequency.

Accordingly, when driving an inductive load such as a motor, it is desired that the high switching frequency remain high even at low output modulation frequencies. This is to allow the inductive nature of the load to limit the currents, due to high frequency switching, to a value which is small compared to the current due to the modulation amplitude. In this way the inductance of the motor then presents adequate impedance to maintain the peak currents small compared to the average current.

A common means for generating the appropriate switching command signals for the inverter is carrier modulation. With this technique, it is typical to synthesize three sine waves having the same frequency, amplitude and phase relationship desired of the output. These waveforms are compared with a common carrier waveform. The carrier is typically a sawtooth or triangular waveform at the desired switching frequency of the inverter. Any time that the modulation sine wave for a phase is larger than the carrier, the output leg of the inverter is switched to the high DC potential. Otherwise, the output is switched to the low DC potential. Thus, carrier modulation provides the appropriate duty cycle modulation of the switching cycle of the inverters.

In a simple implementation of carrier modulation, the carrier frequency is asynchronous, or bears no direct relationship with the modulation frequency. An advantage at low modulation frequencies with this simple technique is that the switching frequency of the inverter is maintained so that the peak currents due to carrier frequency switching are small compared to the fundamental current at the modulation or output frequency. The disadvantage of the asynchronous carrier technique is that the relationship of the carrier to each of the modulation waveforms is slightly different within a modulation cycle and will vary with a given modulation waveform from cycle-to-cycle. Such variations give rise to DC and low frequency AC current flows which have undesirable effects on the rotation of the motor.

A more complex technique that is presently employed is to synchronize the carrier frequency to a triplen multiple of the modulation frequency. The synchronous carrier approach eliminates beating between the carrier frequency modulation frequency present in the more simplified approach. However, in order to maintain the transistor switching frequencies within reasonable limits, the carrier frequency requires frequent changing to new multiples of the modulation frequency. Such changes are complicated to implement and not generally completely smooth.

SUMMARY OF THE INVENTION

Accordingly, it is an object of the present invention to provide an improved form of carrier modulation in conjunction with a control circuit for an AC motor of the inverter type and which employs asynchronous carrier modulation in combination with modulation gating.

Another object of the present invention is to provide a pulse width modulation technique in AC motor control which is adapted to nearly duplicate a true sine wave providing cogless rotation even at low speeds.

A further object of the present invention is to provide a pulse width modulation technique which provides for greatly reduced heating in the motor and also provides fast response, high break away torque and a high power factor on the order of 95% at all operating speeds.

Still another object of the present invention is to provide an improved pulse width modulation control for an AC motor which is rugged in construction, reliable, and operates with a maximum energy efficiency yet delivering 150% of rated current.

Briefly, in accordance with the present invention the carrier may be in the form of a simple triangular or ramp waveform generator which is adapted to free run asynchronously to the modulation frequency. The carrier oscillator is voltage controlled so that an optimum switching frequency is maintained throughout the output frequency range. In accordance with the invention, gating is provided whereby the carrier frequency is essentially restarted from a fixed amplitude a number of times every modulation cycle. The number of gating or restarting times is a function of the number of output phases employed. Thus, for a typical three-phase system the restarting or gating occurs six times every modulation cycle. With this technique phase-to-phase and cycle-to-cycle symmetry is preserved.

BRIEF DESCRIPTION OF THE DRAWINGS

Numerous other objects, features and advantages of the invention should now become apparent upon a reading of the following detailed description taken in conjunction with the accompanying drawing, in which:

FIGS. 6A-6M show waveforms associated with the circuit diagram of FIGS. 4A-4C.

DETAILED DESCRIPTION

Figure 1:
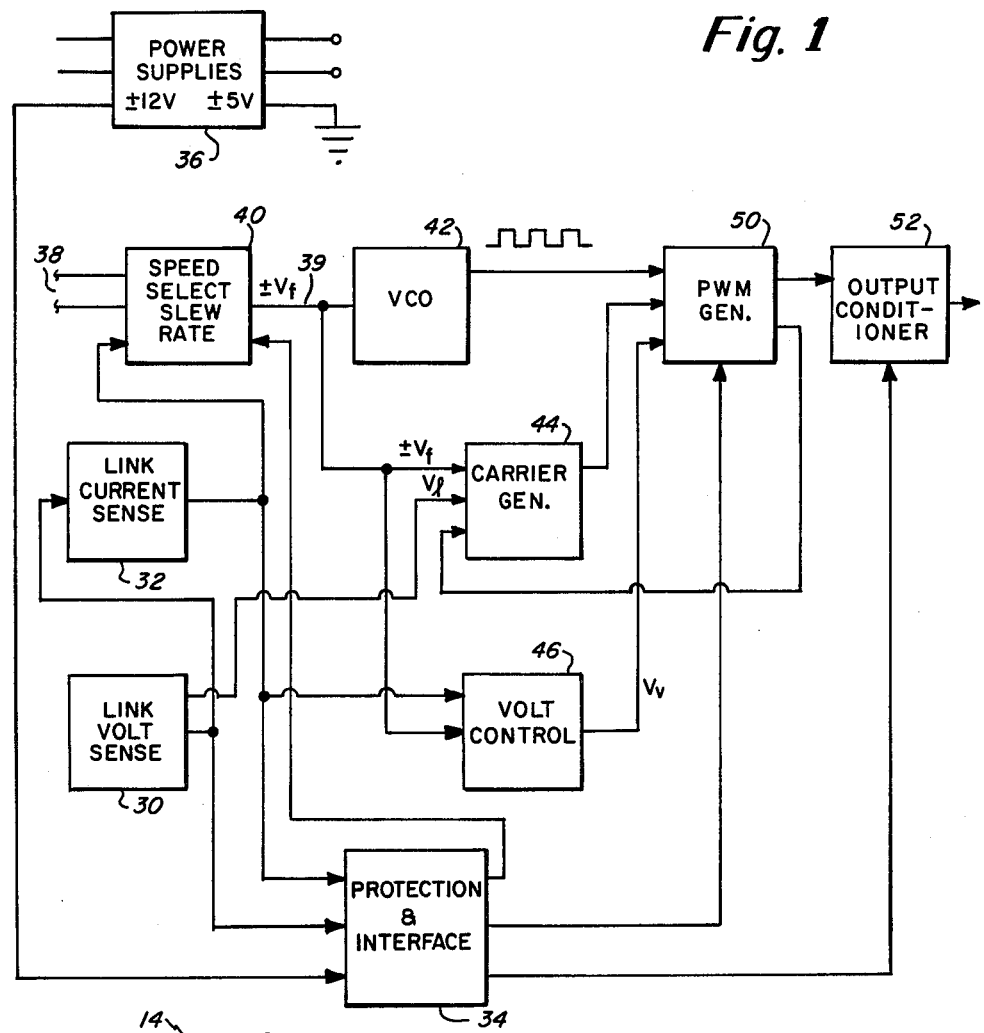
FIG. 1 is a block diagram of control associated with the power inverter of this invention.
Figure 2:
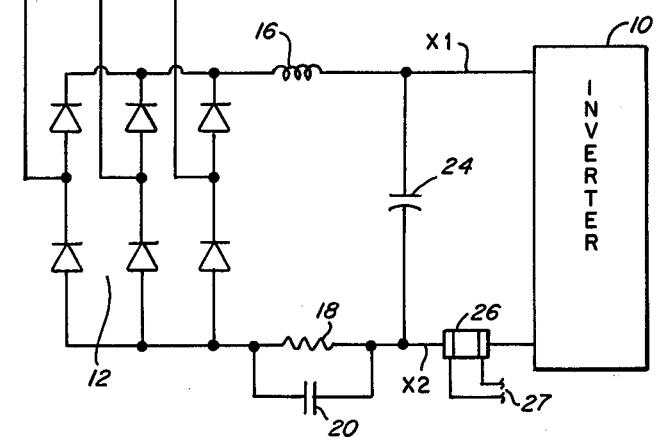
FIG. 2 is a circuit and block diagram showing the generation of the high voltages for the inverter including the link volt and link current signals.
Figure 3:
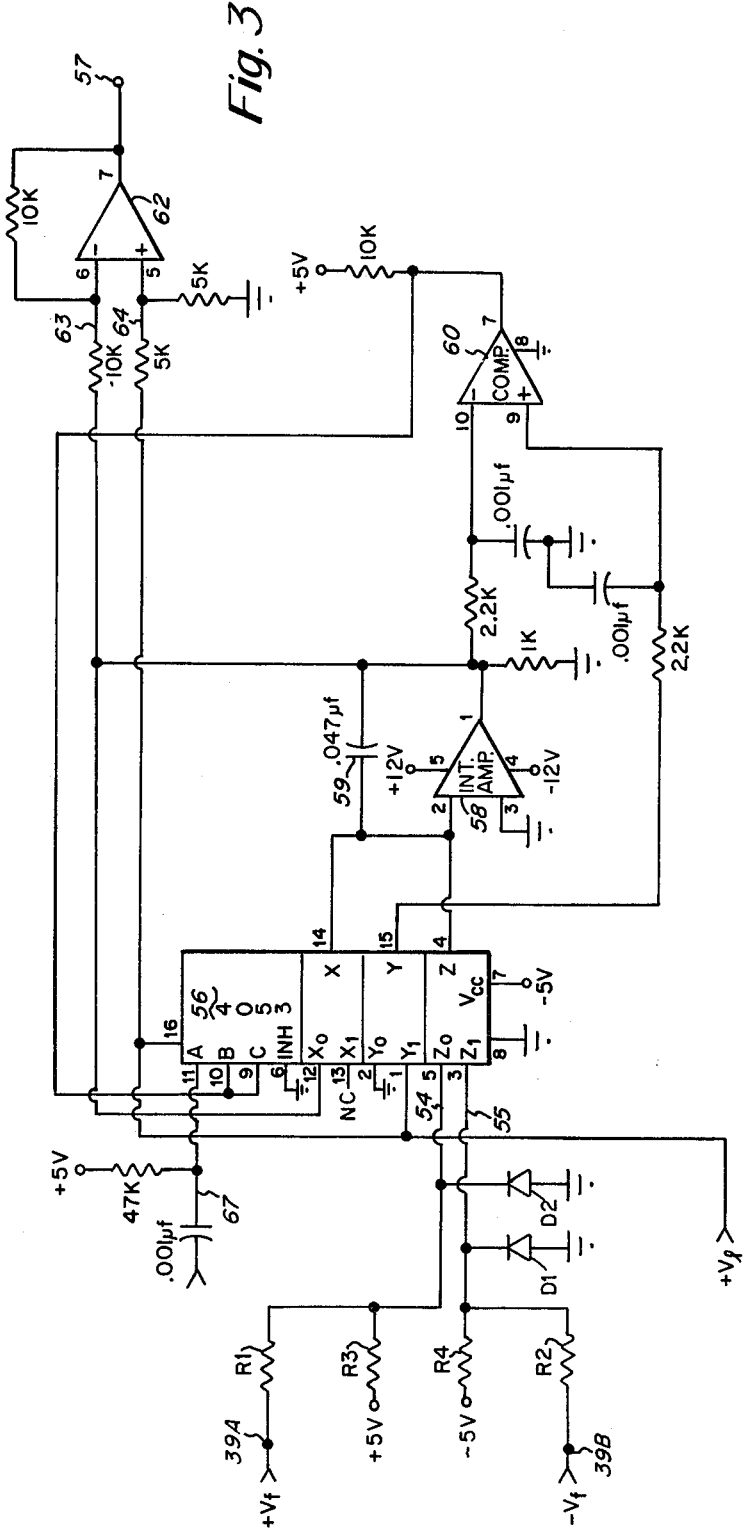
FIG. 3 is a circuit diagram of the carrier generator.

FIGS. 1 and 2 are diagrams illustrating some of the control associated with the inverter drive of an AC motor. This is usually three-phase drive at 230 volts, 60 hertz. Parts of the system shown in FIGS. 1 and 2 are not described in detail as they are considered to be conventional portions of the system. FIGS. 3 and 4 describe in detail the circuitry used in providing the improved gated asynchronous carrier modulation n accordance with the invention. The waveforms in FIGS. 5 and 6 are associated with the circuit diagrams of FIGS. 3 and 4, respectively.

FIG. 1 is a general block diagram of the control section of the inverter. FIG. 2 shows the inverter 10 as a block. The high voltage DC for the inverter is coupled from an input circuit which includes a diode bridge 12 coupled from the AC input line 14. This is a three-phase system and the diode bridge 12 includes three sets of diodes. The bridge 12 couples to an inductor 16 on one side and a low ohmage resistor 18 in parallel with contact 20 on the other side. The resistor 18 may be of a value of 2 ohms. The contact 20 is only open during initial energization of the drive. The motor is generally only started after the contact is closed. This provides some initial current limiting at drive energization and then takes the current limiting out of the circuit. Further detail of a sensing circuit for operating the contact 20 is in copending application Ser. No. 457,880. The lines X1 and X2 then connect to a capacitor 24. It is the capacitor 24 that has a voltage developed thereacross referred to hereinafter as the link voltage. The link current is sensed by a shunt member 26 in the line X2 coupling to the inverter 10. There is an output 27 taken from the shunt 26 that shows a signal proportional to link current.

Now, with reference to FIG. 1 it is noted that there is a block referred to as the link voltage sense block 30 and also a block referred to as the link current sense block 32. It is noted that the signals from these two blocks couple to various other blocks in FIG. 1 for the purpose of control. For example, signals from sensors 30 and 32 couple to the protection and interface circuit 34. FIG. 1 also shows the power supply 36 used for providing voltages including low voltage DC to the various circuits where necessary.

The input commands in FIG. 1 couple to the speed select slew rate box 40. The input lines 38 to this box are commands from the user of the equipment to set such factors as the speed of operation of the drive. The output line 39 from the box 40 is a two-line signal carrying signals $+V_f$ and $-V_f$. These same signals are also shown in FIG. 3 at input terminals 39A and 39B. These signals control voltages couple to the voltage controlled oscillator 42, the carrier generator 44, and the voltage control box 46. The output of the voltage controlled oscillator 42 couples to the pulse width modulation generator 50. Similarly, the outputs from the carrier generator 44 and the voltage control box 46 also coupled to the pulse width modulation generator 50. The voltage from the box 46 coupled to the generator 50 is referred to as voltage $V_y$. The output from the pulse width modulation generator 50 couples to the output conditioner 52.

In FIG. 1 portions of the circuitry are considered to be substantially conventional and not forming a part of the invention now to be described. The conventional portion of the circuit includes such items as the speed select slew rate device 40, the protection and interface box 34, and the output conditioner 52. As such, details of these portions of the system are not shown. However, the details of the gated carrier circuitry is described in FIGS. 3 and 4.

The input signals at terminals 39A and 39B of FIG. 3 couple by way of resistors R1 and R2 to the input lines 54 and 55 coupling to the analog multiplexer circuit 56. The resistor R3 couples to line 54 from the +5 volt supply. Similarly, the resistor R4 couples from the −5 volt supply to the line 55. The voltage between terminals 39A and 39B provides control by virtue of its deviation from a ground reference with the voltage on terminal 39A deviating positively and the voltage on terminal 39B deviating negatively from the ground reference. The magnitude of the voltage deviation controls the carrier frequency which is outputted at terminal 57 from the circuit of FIG. 3. At the input the diodes D1 and D2 keep the respective lines 54 and 55 from varying too far away from ground.

Figure 5A:
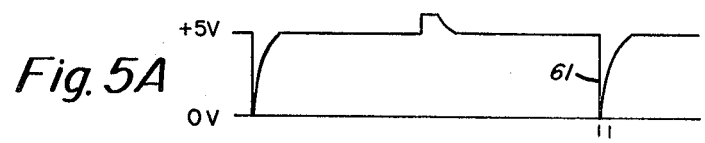
FIGS. 5A-5D show waveforms associated with the circuit diagram of FIG. 3.

As mentioned previously, the device 56 is an analog multiplexer which actually comprises three separate multiplexers each having two inputs. The pairs of inputs are referred to as inputs $X_0$, $X_1$; $Y_0$, $Y_1$; and $Z_0$, $Z_1$. These are associated respectively with the outputs X, Y, and Z. The input multiplexing control is at the input terminals A, B, and C associated respectively with the outputs X, Y and Z. The input $Y_0$ is ground while the input $Y_1$ is at the voltage $+V_1$. The input $X_0$ is taken from the output of the integrating amplifier 58, while the input $X_1$ has no connection. The inputs $Z_0$ and $Z_1$ are taken respectively from lines 54 and 55. The control input at terminal A to device 56 is a pulse signal as shown in FIG. 5A that is normally at a positive voltage and transitions to ground with an impulse. With three-phase operation, the frequency of the signal in FIG. 5A is at a frequency of six times, or twice the number of output phases, the modulation cycle frequency. The inputs at terminals B and C to the device 56 is a common signal taken from the output of the comparator 60.

Figure 5B:
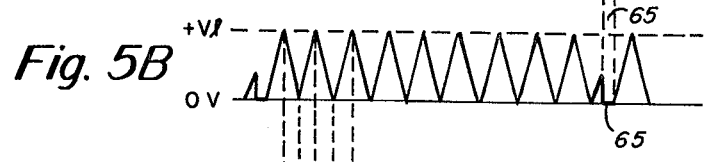
Figure 5C:

When the waveform in FIG. 5A is at its positive level, then there is essentially no signal at the output terminal X from the device 56 coupling to the integrating amplifier 58. Thus, all of the control to the integrating amplifier 58 is from the output Z from the device 56. Reference is now made to FIG. 5B and the waveform which is a triangular waveform generated at the output of the integrating amplifier 58. This is referenced to ground which is the other input to the integrating amplifier. The integration is provided also with the use of the capacitor 59 coupled between the input and output of the integrating amplifier 58. The waveform shown in FIG. 5B indicates that initially there is a positive charging transition of the waveform until the output voltage from the integrating amplifier 58 reaches a predetermined voltage at which time the comparator 60 is triggered to a low output so as to then change the signal at the input terminal C to the device 56 thus then causing a reversal in the integration by virtue of the positive signal now being fed in line 54 to the input $Z_0$ of the device 56. This has the effect of causing the negative ramping signal in FIG. 5B. This signal continues until the integrating amplifier goes to substantially ground potential at which time the output of the comparator 60 then reverts to its positive level again changing the state of the signal on the input terminal C to the device 56 to repeat the ramping process. This has the effect of generating a triangular waveform as illustrated in FIG. 5B at the output of the integrating amplifier 58.

The comparator 60 has its negative input coupled from the output of the integrating amplifier 58 and has its positive input coupled from the output terminal Y of the device 56. The output at terminal Y is controlled from the input terminal B which again is the output from the comparator 60. The signal on the terminal Y is either a ground signal or the voltage $+V_1$. These signals multiplexed to the positive input of the comparator 60 provide the waveform shown in FIG. 5C taken at the output of the comparator 60.

Figure 5D:
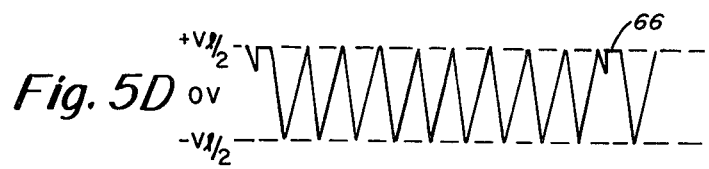

The waveform shown in FIG. 5D is the gated carrier output waveform referenced to ground. in FIG. 3 the circuitry providing this waveform includes level shifting device 62 which at one input 63 receives the output waveform shown in FIG. 5B at the output of the integrating amplifier 58. The other input at line 64 to the device 62 is the signal $+V_1$. The combination of these signals has the effect of shifting the triangular waveform so that it is referenced to ground.

With respect to the gating provided by the input gating signal on line 67 shown in FIG. 5A, this has the effect of multiplexing the output at terminal X from the device 56. When the impulse occurs, this has the effect of essentially overriding the Z output from the device 56 coupled to the integrating amplifier 58. This clamps the output of the integrating amplifier for a period of time corresponding in substance to the width of the pulse 61 shown in FIG. 5A. The width is shown at 65 in FIG. 5B. During this small predetermined period the signal stays at ground reference. This also has the effect of holding the output of the comparator shown in FIG. 5C at its high level for a longer period of time. In this regard it is also noted that FIG. 5D shows the flat table 66 on the triangular waveform.

In FIG. 3 there has been thus generated the gated carrier frequency. This gated carrier frequency is shown also at the terminal 57 in FIG. 4B. FIG. 4 shows the details of the pulse width modulation generator 50.

Figure 4A:
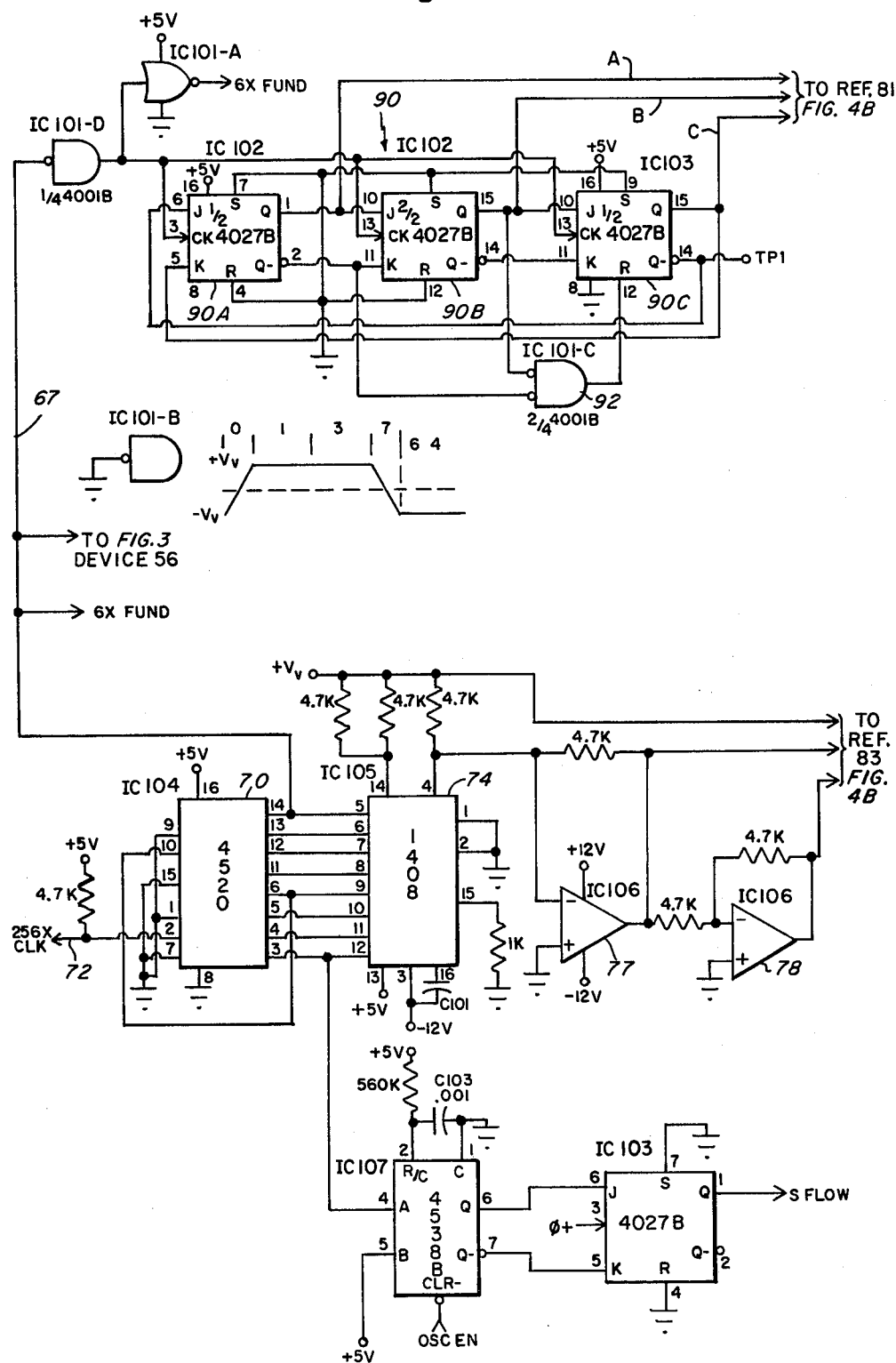
FIGS. 4A-4C collectively form a circuit diagram of the pulse width modulation generator shown in FIG. 1.
Figure 4B:
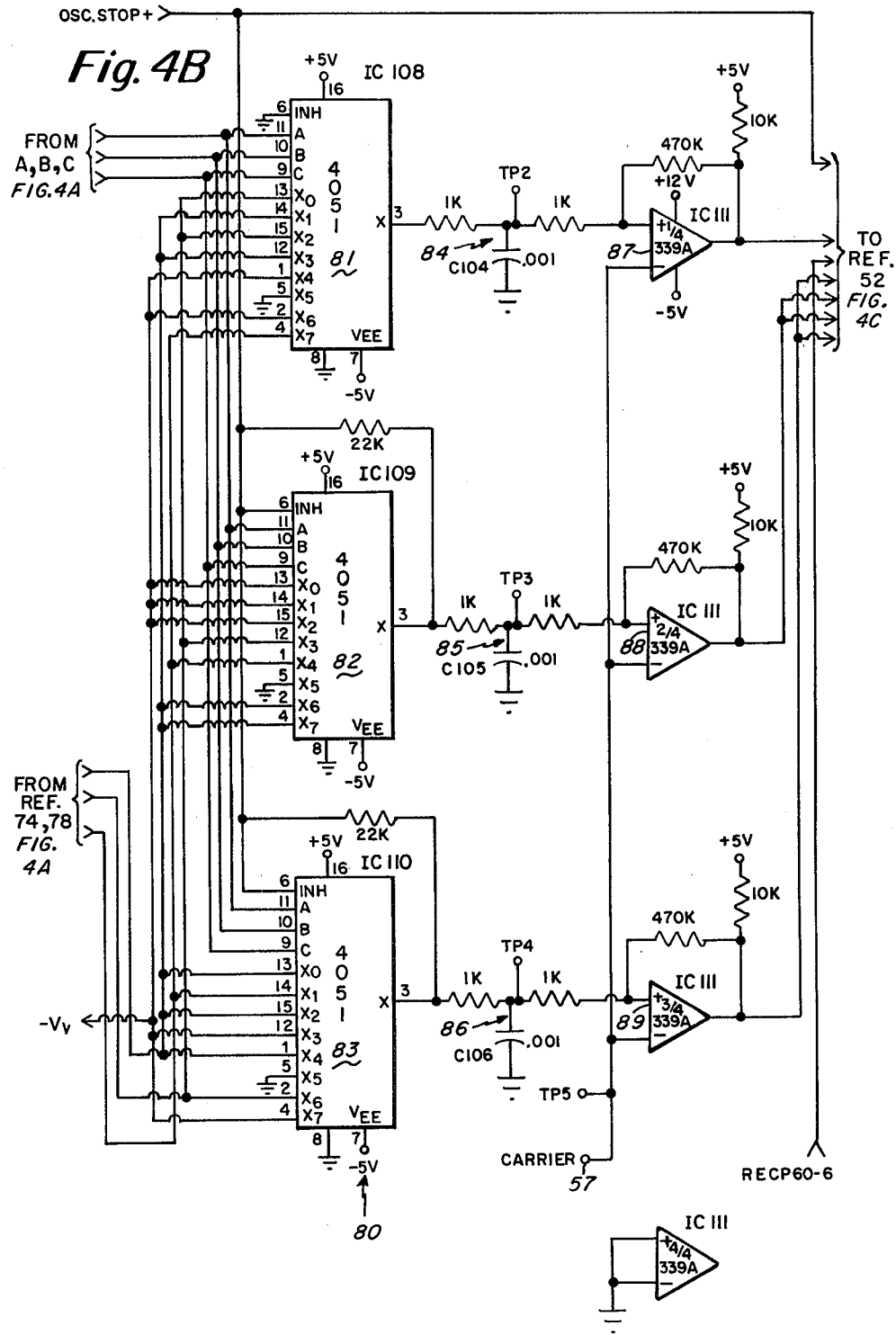

In FIG. 4A there is shown an 8-bit up counter 70 which is of type 4520 receiving an input clock signal on line 72. This is at a frequency of 256 times the clock frequency. A number of outputs are taken from the counter 70, most of which couple to the digital-to-analog converter 74 which is also an 8-bit device of type 1408. One of the signals taken from the counter 70 at line 67 is the aforementioned gate signal shown and described previously in connection with FIG. 3 and inputted to the multiplexer device 56. The output from the digital-to-analog converter 74 couples to operational amplifier devices 77 and 78. The output from the device 77 is referred to as a "ramp up" signal and is shown in FIG. 6E. Similarly, the output from the device 78 is referred to as a "ramp down" signal and is shown in FIG. 6F. These signals from devices 77 and 78 along with the control voltages from the voltage control box 46, namely, signals $+V_\nu$ and $-V_\nu$ couple to the trapezoidal generation circuit 80 which comprises three multiplexer devices 81, 82 and 83. All three of these multiplexer devices are of type 4051. The multiplexers along with associated output circuits 84, 85 and 86 provide for the generation of a trapezoidal waveform as depicted in FIGS. 6G, 6H and 6I. There are three such trapezoidal waveforms with the appropriate phase relationship therebetween as depicted, and each respectfully coupling to a comparator. FIG. 4B shows the comparators 87, 88 and 89.

The phase relationship for the trapezoidal waveforms is generated from the counter 90 which is also shown in FIG. 4A. The counter 90 includes three stages 90A, 90B and 90C and an associated logic gate 92. This counter receives the signal on line 67 which is the waveform previously shown in FIG. 5A. This pulse waveform provides three outputs on lines A, B and C from the respective stages 90A, 90B and 90C. These are referred to as waveforms phase A, phase B and phase C. These three waveforms and their phase relationship are shown in FIGS. 6B, 6C and 6D. The counter 90 may be set up to count in any one of a number of different binary formats but with the counting being on a repetitive basis so as to provide the waveforms as depicted. The three phase signals are shown coupling to the trapezoidal waveform generator 80. The various inputs to the multiplexers 81, 82 and 83 are interconnected so as to provide the proper output trapezoidal waveforms shown in FIGS. 6G, 6H and 6I.

The devices 87, 88 and 89 thus each receive one phase of the trapezoidal waveform along with the input carrier waveform at terminal 57 which couples in common to the negative input of each of these devices. The carrier waveform is the one shown in FIG. 5D.

Figure 4C:
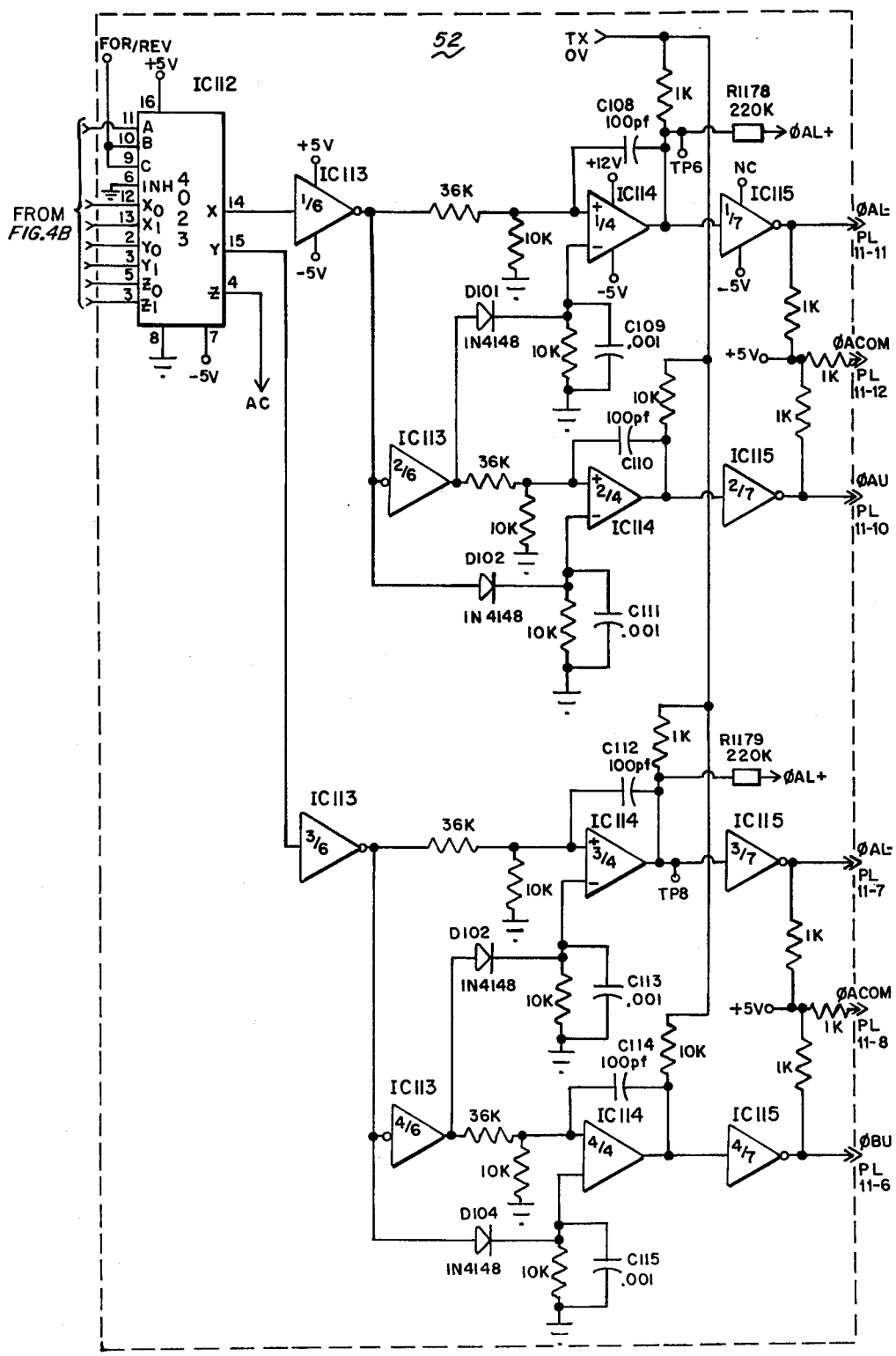

Now, with reference to the waveforms FIGS. 4A–4C, reference has been made hereinbefore to the three phase square waveforms shown in FIGS. 6B, 6C and 6D. The ramp waveforms are shown in FIGS. 6E and 6F. The trapezoidal waveforms for the three different phases referred to hereinbefore are shown in FIGS. 6G, 6H and 6I. These are the waveforms that are taken respectively at the output of the multiplexer devices 81, 82 and 83. FIG. 6J is actually a repeat of the previously shown and described FIG. 5D. This is the waveform coupled into the terminal 57 shown in FIG. 4. This is the carrier waveform that is essentially mixed with the trapezoidal waveforms to provide the pulse width modulated waveforms depicted in FIGS. 6K, 6L and 6M. These waveforms are respectively associated with the outputs from the comparator devices 87, 88 and 89, respectively.

Now, the outputs from the comparators 87, 88 and 89 couple to the output conditioning circuit 52 referred to hereinbefore in FIG. 1. This circuit is of conventional design and thus, although the entire circuit is shown it is not described in any detail herein. Basically, the purpose of the circuit is to bring about modifications of waveforms so that one is assured that one power transistor of a phase is turned off sufficiently before the other power transistor associated with that phase is turned on. In this regard, it is noted that the output of the signal conditioner includes a common terminal and also phase terminals for lower and upper transistors of each phase. Again, the output power transistors are in a conventional network and are also not described in detail herein. Actually, in FIG. 4C the conditioning circuitry for only two phases is represented.

What is claimed is:

1. Motor pulse width modulation control apparatus comprising;
    means for establishing a repetitive modulation signal,
    means for generating a carrier frequency signal at a frequency greater than the frequency of the modulation signal,
    means for gating the carrier frequency signal at a gating rate less than the frequency of the carrier frequency signal so as to provide a gated carrier frequency signal,
    and means for modulating the gated carrier frequency signal by the repetitive modulation signal so as to provide a cyclic pulse width modulation drive signal for motor control,
    said means for gating the carrier frequency signal comprising means for generating, on an asynchronous basis to the modulation signal, a resetting of the carrier frequency signal whereby the carrier frequency is restarted a number of times every modulation cycle,
    said carrier frequency being restarted from a fixed amplitude at each gating.

2. Motor control apparatus as set forth in claim 1 wherein said means for generating a carrier frequency comprises a carrier frequency oscillator that is voltage controlled.

3. Motor control apparatus as set forth in claim 1 wherein said means for generating a carrier comprises a waveform generator which runs asynchronously to the modulation frequency.

4. Motor control apparatus as set forth in claim 3 wherein said waveform generator comprises a triangular waveform generator.

5. Motor control apparatus as set forth in claim 3 wherein said waveform generator comprises a ramp waveform generator.

6. Motor control apparatus as set forth in claim 1 wherein the frequency of the gating signal is at a rate of at least twice the number of phases times the modulation frequency.

7. Motor control apparatus as set forth in claim 1 wherein the modulation signal is three phase and the gating signal is at a frequency of six times the modulation frequency.

8. Motor control apparatus as set forth in claim 1 wherein said means for establishing a modulation signal comprises a trapezoidal waveform generator.

9. Motor control apparatus as set forth in claim 8 wherein said trapezoidal waveform generator comprises ramp-up circuit means, ramp-down circuit means and multiplexer means.

10. A method of motor pulse width modulation control comprising the steps of;
    establishing a repetitive modulation signal,
    generating a carrier frequency signal at a frequency greater than the frequency of the modulation signal,
    gating the carrier frequency signal asynchronously to the modulation signal at a gating rate less than the frequency of the carrier frequency signal with the carrier frequency being restarted from a fixed amplitude at each gating and a number of times every modulation cycle,
    and modulating the gated carrier frequency signal by the repetitive modulation signal so as to provide a cyclic pulse width modulation drive signal for motor control.

* * * * *